United States Patent

Erdman

[15] 3,707,670

[45] Dec. 26, 1972

[54] VARIABLE LOW RESISTANCE CIRCUIT WITH SUPERCONDUCTING SHUNTS

[72] Inventor: Robert J. Erdman, Twinsburg, Ohio

[73] Assignee: Keithley Instruments, Inc., Solon, Ohio

[22] Filed: April 1, 1969

[21] Appl. No.: 811,895

[52] U.S. Cl. ....................323/96, 307/245, 307/277, 338/32 S, 338/227

[51] Int. Cl. ..............................H01c 1/00, H01c 7/16

[58] Field of Search ....323/9, 44 F, 94, 96; 338/32 S, 338/49, 227; 307/245, 277, 306

[56] References Cited

UNITED STATES PATENTS

| | | | |
|---|---|---|---|
| 3,056,889 | 10/1962 | Nyberg | 307/277 X |
| 3,098,967 | 7/1963 | Keck | 323/94 |
| 3,278,808 | 10/1966 | Bonfeld | 307/245 X |
| 3,443,255 | 5/1969 | Massar | 323/9 |

*Primary Examiner*—Gerald Goldberg
*Attorney*—Yount, Flynn & Tarolli

[57] ABSTRACT

Low resistance circuit, for use in series with superconducting component, having resistance value changeable between a low resistance and that of a superconductor below its critical temperature $T_c$. A superconducting switch is rendered non-superconducting by heating, while in a cryogenic environment, with an electric resistor.

4 Claims, 4 Drawing Figures

INVENTOR.
ROBERT J. ERDMAN
BY
Yount, Flynn & Tarolli
ATTORNEYS

VARIABLE LOW RESISTANCE CIRCUIT WITH SUPERCONDUCTING SHUNTS

The present invention relates to variable electric resistance circuits and particularly to circuits for changing the magnitude of resistance in circuits of very low resistance, for example, a circuit having a resistance between $10^{-3}$ ohms and $10^{-7}$ ohms.

It is an object of the present invention to provide a new and improved variable low resistance circuit for use with superconductors.

It is another object of the present invention to provide a new and improved circuit for use in superconducting circuits to change the resistance of a circuit from that of a superconductor to a magnitude above zero but less than that of a superconductor above its critical temperature $T_c$.

A still further object of the present invention is to provide a new and improved circuit in which a superconductor is heated in a cryogenic environment to render it non-superconducting to change a short circuit around a low resistance to a relatively high resistance.

Further advantages of the present invention will be apparent from the following detailed description thereof made with reference to the accompanying drawing and in which.

The present invention is illustrated as embodied in an instrument for measuring voltages in the picovolt range.

Figure 1:
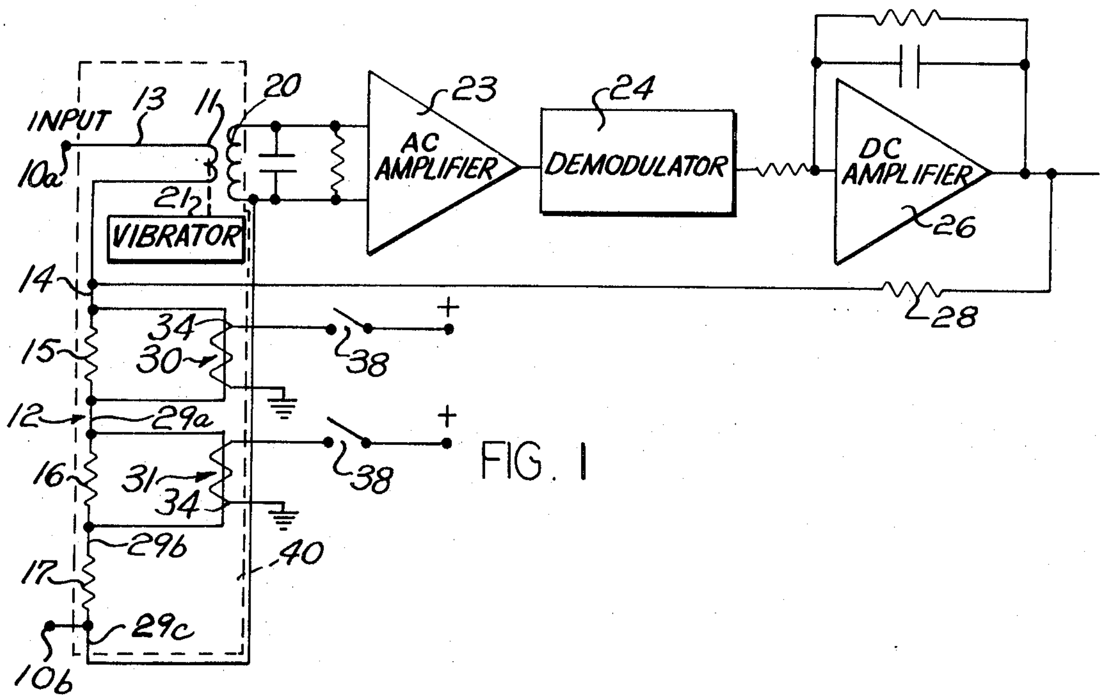
FIG. 1 is a schematic drawing of an instrument embodying the present invention.

The instrument, as indicated in FIG. 1, may comprise input terminals 10*a*, 10*b* for D.C. voltage to be measured. The input circuit includes an input coil 11 connected to the terminal 10a and to the terminal 10*b* through a resistance circuit 12. The coil is made from superconducting wire and the lead 13 from the coil to the terminal 10*a* and the lead 14 to the resistance circuit 12 are also superconducting wires. The resistance circuit 12 comprises cryogenic resistances 15, 16 and 17 connected in series. Cryogenic resistances have lower resistances at low temperatures than at room temperatures but are not of superconducting material.

The input coil 11 is coupled to an output coil 20 and is vibrated by a vibrator 21 to establish an A.C. signal in the output coil. The output coil and the leads therefrom are also made of superconducting wire.

The output from the coil is applied to an A.C. amplifier 23 whose output is synchronously demodulated by a demodulator 24 to provide a D.C. signal which is amplified in a D.C. amplifier 26. A feedback circuit is connected between the D.C. amplifier and the input circuit as shown in the drawing. The feedback voltage is determined by resistor 28 and resistance network 12. With the described feedback and proper attenuation by resistor 28, the circuit operates in a null detecting arrangement.

The output of the amplifier 26 may be connected to a suitable indicating meter.

During operation, it is desirable to be able to change the resistance between the coil 11 and the terminal 10*b* to adjust the closed loop gain of the instrument. Because of the small voltages involved, the resistance of the resistors must be very small. For example, the cryogenic resistors 15, 16 and 17 may have resistances of $10^{-4}$, $3 \times 10^{-6}$ and $10^{-7}$ ohms, respectively in a cryogenic environment. The leads 29*a*, 29*b* and 29*c* between the cryogenic resistors and between resistor 17 and the terminal 10b are superconductors, otherwise the lead resistance would introduce significant undesirable resistance into the circuit.

The resistance of the circuit 12 is controlled by thermally operated superconducting switches 30,31 respectively, each formed by a superconducting wire 34 which can be selectively rendered superconductive or not. When cooled below its critical temperature $T_c$ the superconducting wire 34 provides a superconducting short circuit across the corresponding resistor to effectively remove the corresponding resistor from the circuit. When heated while in the cryogenic environment to a temperature above its critical temperature $T_c$, the superconducting wire has large resistance as compared to the resistor across which it is connected. The resistance is then effectively the resistance of the resistor alone.

Figures 2, 3:
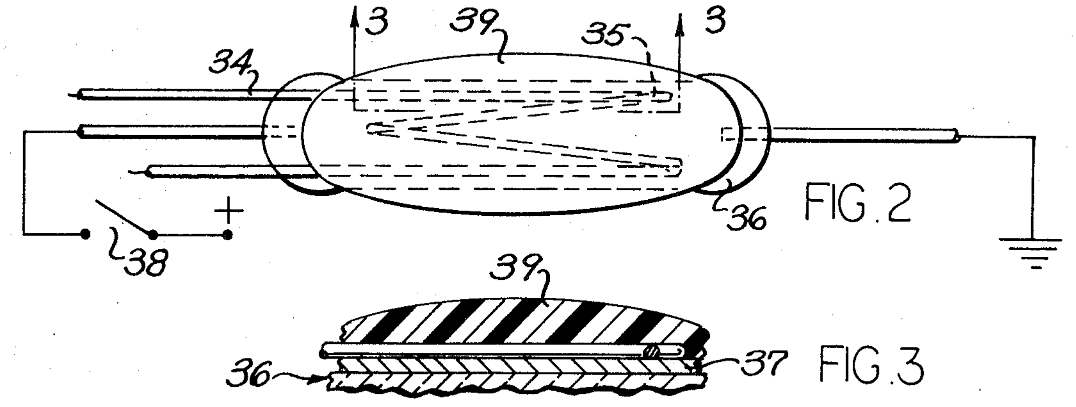
FIG. 2 is a view of a superconducting switch used in the circuit of FIG. 1.
FIG. 3 is a fragmentary sectional view along line 3—3 of FIG. 2.
Figure 4:
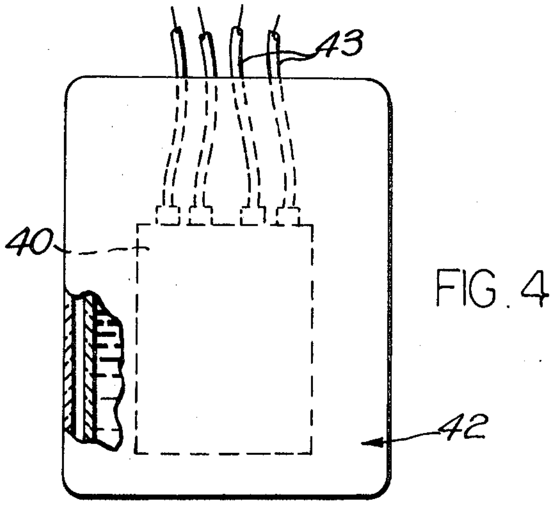
FIG. 4 is a general showing of a cryogenic housing.

A superconducting switch is shown in FIG. 2. The switch is made of the superconducting wire 34 having a portion 35 bonded to the exterior of a thin resistor 36 so that there is a good heat transfer between the resistor and the superconductor. The thin film resistor 36 comprises a thin film of metal 37 deposited on a dielectric substrate. Various forms of thin film resistors may be used. For example, the thin film may be on a flat substrate or a cylindrical substrate.

The portion 35 of the superconducting wire may be bonded to the substrate by using epoxy 39 and advantageously the portion 35 is zig-zag in form. The zig-zag is a generally low inductance pattern which increases the length of the bonded portion without introducing large inductance into the circuit. The thin film resistor is connected to an energizing source through a switch 38 so that when the switch is closed, current flows through the thin film resistor to heat the superconducting wire above its critical temperature $T_c$.

The resistors 15 and 16 and the switches 30,31 are in the low temperature environment for rendering the superconducting wires superconducting but are heated by the current in resistor 36 to a temperature above their critical temperature $T_c$. When a superconducting wire is heated above its temperature $T_c$, it has a resistance which is significantly higher than the calibrated resistor which it shunts, for example, the resistance of the superconductor in the preferred embodiment may be 0.01 to 1 ohm. Thus, the resistance of the parallel connected resistor and superconducting switch, when the latter is heated, is effectively that of the resistor of $10^{-3}$ ohms to $10^{-7}$ ohms as the case may be.

All of the superconducting and cryogenic components are housed in a housing or container which, through the use of known cryogenic techniques, is maintained at a low temperature such that the superconducting components are normally below their critical temperature $T_c$. For example, the superconducting and cryogenic components may be in a stainless steel container 40 immersed in a liquid helium bath 41 contained in a Dewar flask 42. Conductors 43 lead from the container to other apparatus and to the input source. Various techniques for cooling the cryogenic components may be used and these will be well known to those skilled in the art.

The superconductors may be solder coated manganin or superconducting wire used for magnets and the cryogenic resistors may be made from copper or copper alloys. It is understood that in the described circuit, all leads and components between the terminals 10a and 10b are superconductors except for the resistors 15, 16, 17.

Thus, it can be seen that the present invention provides a new and improved method and apparatus for obtaining a variable circuit of extremely low resistance and particularly a variable resistance circuit for use in series with a superconducting component to control resistance in series therewith. Also, the present invention provides a device for readily switching a superconductor between superconducting and non-superconducting states.

What is claimed is:

1. A circuit having a portion whose resistance value is changeable between that of a superconductor to a small resistance value comprising a first resistor, said first resistor having a small resistance value, superconducting wires for connecting said resistor into the circuit, and additional superconducting wire connected across said resistor to short circuit the same, and heating means for selectively heating said additional superconducting wire while disposed in a cryogenic environment for cooling the wire below its critical temperature $T_C$ to heat the additional wire above its critical temperature $T_C$ whereby said portion of said circuit has the small resistance value of said first resistor when said heating means has heated said additional superconducting wire above its critical temperature and said portion of said circuit is superconductive when said additional superconducting wire is below its critical temperature.

2. A circuit as defined in claim 1 wherein said heating means comprises an electrical resistance element mounted in juxtaposition to said additional superconducting wire and means for selectively establishing a current flow in said element.

3. A circuit as defined in claim 2 wherein said circuit further comprises a second resistor, and superconductors connecting said second resistor in series with said first resistor.

4. The method of changing the magnitude of the electrical resistance in series in a superconducting circuit which includes at least one cryogenic resistor in the circuit comprising cooling the circuit to superconducting temperatures to establish superconduction in the circuit, shunting the cryogenic resistor in the circuit with the superconductor, and selectively heating or cooling the shunting superconductor to effectively render the latter superconducting or non-superconducting selectively.

* * * * *